United States Patent [19]

West et al.

[11] Patent Number: 4,904,428

[45] Date of Patent: Feb. 27, 1990

[54] METHOD OF MAKING A FOAM INSULATED WATER HEATER

[75] Inventors: Eugene L. West, Grand Rapids; Robert J. Marcinkewicz, Plainwell, both of Mich.

[73] Assignee: Bradford-White Corporation, Philadelphia, Pa.

[21] Appl. No.: 743,422

[22] Filed: Jun. 11, 1985

[51] Int. Cl.$^4$ .............................................. B29C 67/22
[52] U.S. Cl. .................................. 264/46.5; 264/46.9; 264/262
[58] Field of Search ....................... 264/46.9, 46.5, 262

[56] References Cited

U.S. PATENT DOCUMENTS

| | | | |
|---|---|---|---|
| 4,372,028 | 2/1983 | Clark et al. | 264/46.9 X |
| 4,447,377 | 5/1984 | Denton | 264/46.9 X |
| 4,477,399 | 10/1984 | Tilton | 264/46.9 X |

OTHER PUBLICATIONS

Bender, Rene J., *Handbook of Foamed Plastics*, Libertyville, Ill., Lake Publishing Corp., ©1965, pp. 70, 125–146.
Ferrigno, T. H., *Rigid Plastics Foams*, New York, Reinhold, ©1963, pp. 74–114.
Brydson, J. A., *Plastics Materials*, Princeton, N.J., D. Van Nostrand, ©1966, p. 105.
*Whittington's Dictionary of Plastics*, by Lloyd R. Whittington, Stamford, Conn., Technomic, ©1968, Preface, pp. 114, 115, 149, 150.
Celanese Bulletin: *Standard Tests on Plastics*, Bulletin GIC, 7th Edition, Newark, N.J., Celanese Plastics Co., Div. of Celanese Corp., Apr. 1974, p. 13.
McKelvey, James M., *Polymer Processing*, New York, John Wiley and Sons, Inc., ©1962, pp. 31–36.
*Encyclopedia of Polymer Science and Technology*, vol. 8, New York, Interscience Publishers, Div. of John Wiley & Sons, ©1972, pp. 587–592.
*Rapra New Trade Names in the Rubber and Plastics Industries*, 1986, Edited by Elaine Davison, New York, Pergamon Journals, Intro.; p. 48.

*Primary Examiner*—Jan H. Silbaugh
*Assistant Examiner*—Allan R. Kuhns
*Attorney, Agent, or Firm*—Austin R. Miller

[57] ABSTRACT

A method of insulating a water heater with an expandable foam insulating material. The expandable foam insulating material has an initial viscosity of <300 cps, a flow index≧about 0.7, a gel index≧about 0.8 and generates a maximum pressure of≦about 1.0 psig. The foam is injected into the annular space between the water tank and the outer jacket. Preferably, the foam is injected into a sleeve, which acts to confine the foam during its most liquid state, positioned within this space. The foam is preferably injected into the annular space between the tank and the jacket while the top cover is removed. In this way, the injected foam can be distributed more evenly around the circumference of the tank.

9 Claims, 2 Drawing Sheets

METHOD OF MAKING A FOAM INSULATED WATER HEATER

BACKGROUND OF THE INVENTION

1. Field of the Invention

The present invention relates to methods of making foam insulated water heaters. More particularly, the present invention relates to a method of insulating a water heater tank with a novel, low viscosity expandable polyurethane foam insulation material.

2. Description of the Prior Art

The advantage of using rigid polyurethane foam insulation in water heater construction has been recognized for several years. For example, the heat conductivity of polyurethane foam is lower than that of glass fibers, thereby providing superior insulation properties. Thus, it is possible to obtain the same or better insulation properties utilizing a substantially reduced insulation wall thickness, as compared to conventional insulation materials, such as glass fibers. This results in more energy efficient water heaters a reduced size thereby providing lower packaging and shipping costs.

In addition, the rigidity of the foam insulation, when compared with that of glass fibers, provides improved resistance to dents in the exterior jacket of the tank. This factor permits the use of less sophisticated (and therefore less expensive) shipping containers.

Although the superior insulating properties of expandable foam materials such as polyurethane have been well recognized for many years, the use of foam as an insulating material in water heaters has been to date quite limited. This is due at least in part to the production problems encountered using expandable foam materials resulting in higher production costs. One of the major problems associated with water heater manufacturing, and particularly the production of foam insulated water heaters, has been the method by which the foam insulation layer is formed about the tank. Generally, the foam is injected as a liquid which continually expands and eventually matures into a rigid foam layer. Usually the liquid foam is injected into the annular space between the inner tank and the outer jacket. Unfortunately, the liquid foam has a tendency to leak out of any small openings in the seams of the outer jacket. In addition, the sides of the tank generally are provided with openings such as a drain opening or with valves such as a temperature and pressure release valve. Also attached to the sides of the tank are electric controls and other components such as thermostats. In the past, it has been a serious problem in preventing these openings and components from becoming covered with foam, interfering with subsequent servicing, repair, adjustment, etc.

One way of shielding these areas from the expanding foam has been to pack the regions, between the tank and the outer jacket, surrounding the nipples and controls with glass fiber insulation material. The glass fiber insulation material then serves as a "foam dam" during the foaming operation.

Other processes utilize a plastic bag filled with the expanding foam material, the bag being positioned around the tank. In U.S. Pat. No. 4,372,028 the liquid foam material is first injected into a bag. The bag is then sealed and positioned circumferentially or longitudinally about the tank. The bag may have welded cut out openings which fit over any components attached to the exterior wall of the tank. Because the foam is wholly contained within an enclosed plastic bag, there is no danger of the foam leaking into unwanted areas. Once the foam within the bag expands sufficiently, it forms an effective dam about the electrical control or other area. Subsequently, the remaining annular space between the tank and the outer jacket is foamed.

U.S. Pat. No. 4,447,377 utilizes another type of plastic bag used in foam insulated water heaters. The bag has a shape which may extend substantially around the entire circumference of the tank. The bag is first positioned around the tank and then the outer jacket is positioned around the bag. Cur out weld holes may be provided in the bag and positioned about any components such as electrical controls, thermostats, drain lines, etc. The top pan is then positioned over the jacket and foam is injected, through a single opening in the top pan, into the bag. Since the expanding foam is wholly contained within the bag, there is no danger of unwanted foam leakage.

Unfortunately, the foaming bags or envelopes used in the prior art have encountered serious problems. In applications such as electric water heaters, the bags are typically used over only a portion of the tank surface. Those areas of the tank surface having electrical control components and other devices (such as thermostats, temperature and pressure relief valves and drain openings) are packed with blocks of conventional insulation materials such as foam or glass fibers. In these applications it is necessary to tailor the size and shape of the bag so that it precisely dovetails with these blocks of glass fibers or foam. This is difficult from both design and production standpoints since the positioning of the bag on the tank surface prior to foam injection becomes quit critical.

In addition, the enclosed bags or envelopes, typically composed of airtight materials such as polyethylene sheet, have a strong tendency to trap air in the corners of the bag, thereby forming voids when the foam eventually sets. The problem of foam voids becomes especially acute as the size of the insulation cavity is reduced. Additionally, the mass of the bag impedes the flow and expansion of the foam and prevents the foam from completely filling the cavity.

In addition, further problems are encountered when foam is injected through a single opening in the top pan. Due to the single opening, the injected foam is typically injected in a short single shot in a rather localized space between the tank side wall and the outer jacket. As the injected foam begins to expand, there is a tendency for the expanding foam to push the tank off center with respect to the outer jacket, and in some extreme cases to cause bulging to occur in the thin flexible jacket. Thus, it is an object of the present invention to provide a foaming method which will alleviate these localized high pressure areas caused by the expanding foam material.

It has now been discovered that the problem of localized pressure buildups can be alleviated by injecting the polyurethane foam material before the top pan is secured over the outer jacket. In this way, the shot of injected foam can be articulated around the annular space between the tank and the jacket. In addition, multiple single shots of the foam material can be injected without the necessity (and attendant costs) of providing a number of holes and corresponding plugs in the top pan.

It has further been discovered that the disadvantages associated with the prior art bags and envelopes may be overcome utilizing a foam composition having an unusually low initial viscosity, having high flow and gel indices and which generates lower foaming pressures than the prior art foams. It has also been discovered that using these new foams it is no longer necessary to use the foam restrictive bags and envelopes of the prior art which were so troublesome from the production and void formation standpoints.

Certain embodiments of the present invention may also utilize a novel sleeve configuration which wholly obviates the problems encountered with attempting to dovetail the enclosed bags and envelopes of the prior art against insulation blocks.

SUMMARY OF THE INVENTION

These and other objects of the present invention are met by a method of making water heater including a tank and an outer jacket surrounding the tank and spaced therefrom in order to provide an annular space therebetween, wherein a foam insulating material is provided in the annular space, and wherein the foam insulating material is formed by injecting a foamable liquid having a low initial viscosity, high flow and gel indices and which generates low foaming pressures as it expands. These foams are preferably injected into a plastic sleeve whose bottom end is fixed around the circumference of the tank providing a seal therebetween. The tank wall may typically have a component, such as a relief valve, an electrical control, a thermostat, drain opening, etc., which must be kept substantially free from contact with the expandable liquid foam material. In such cases the plastic sleeve contains a dam of insulating material, the dam positioned to protect the component attached to the exterior wall of the tank, and forming a seal between the sleeve and the tank thereby preventing the foam from contacting the components.

The foams are preferably injected into the annular space between the tank and the outer jacket prior to securing the top pan over the jacket. In this way, the foam injection can be articulated around the tank in order to avoid localized pressure buildup caused by the expanding foam.

DESCRIPTION OF THE PREFERRED EMBODIMENTS

Figure 2:
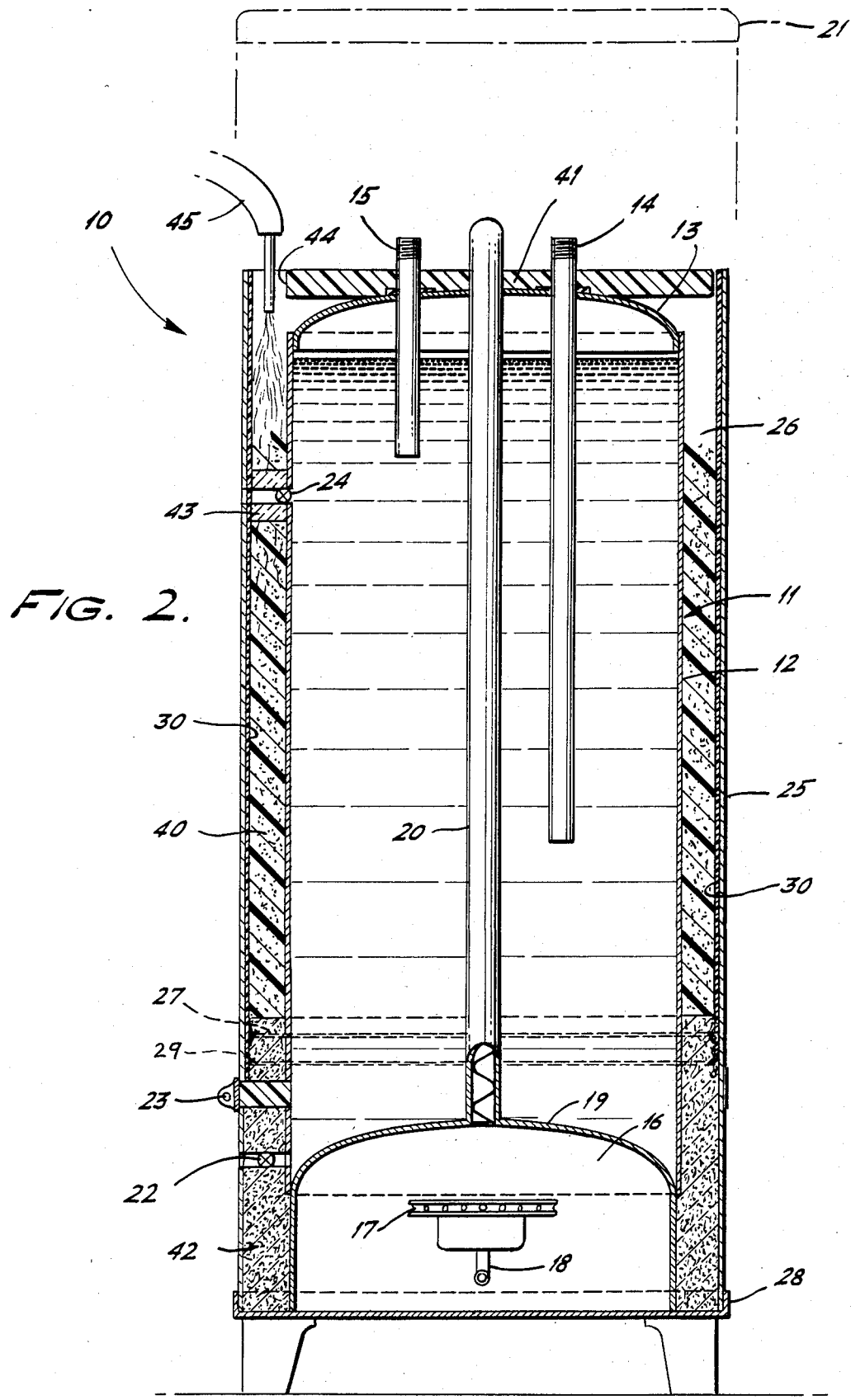
FIG. 2 is a side elevational view, shown partly in section, of a water heater including a water tank and an outer jacket with a sleeve during a preferred foam injection step in accordance with this invention. Although specific forms of apparatus have been selected for illustration in the drawings, and although specific terminology will be resorted to in describing those forms in the specfication which follows, their use is not intended to define or limit the scope of the invention which is defined in the appended claims. Although a gas type of water heater has been selected for illustration as a matter of convenience, the invention applies as well to electric heaters or any others. Although a preferred plastic sleeve has been selected for illustration in the drawings, the foaming methods of the present invention may be used with or without aprons, bags, envelopes, or ordinary glass fiber foam dams.

Referring to the drawings wherein like reference numerals refer to the same features in the several drawings, and especially referring to FIG. 2, there is shown gas water heater 10. Water heater 10 consists of a water gas water heater 10. Water heater 10 consists of a water tank 11 a side wall 12, a tank head 13, a tank base 19 and an internally baffled flue pipe 20 extending therethrough. Positioned beneath tank 11 is combustion chamber 16 containing gas burner 17 and gas supply line 18. A bottom pan 28 is provided beneath chamber 16. Heater 10 also has a cold water inlet nipple 14 and a hot water supply nipple 15. Nipples 14, 15 and flue pipe 20 are each surrounded with a block 41 of glass fibers or other insulating material above tank head 13 in order to effectively prevent the injected foam from leaking through the openings (provided for the nipples 14, 15 and flue pipe 20) in the top pan 21 of the water heater 10. Surrounding tank 11 and combustion chamber 16 is outer jacket 25, typically constructed of a thin guage sheet metal. The diameter of jacket 25 is greater than the diameter of tank 11, thereby creating an annular insulating space 26 therebetween.

The distance between the outer jacket 25 and the side wall 12 has typically been in the range of 1 to 3 inches. However, as a result of recent trends to decrease the overall size of water heaters, this distance is now more likely to be in the range of about one-half to about two inches.

Gas water heater 10 is provided with a number of components on the wall 12 of the tank 11. For instance, near the bottom of the tank 11 there is provided a drain opening 22 and thermostat 23. Both drain opening 22 and thermostat 23 are positioned near the bottom portion of tank 11 and are surrounded by a conventional glass fiber insulation blanket 42. Glass fiber blanket 42 having cut-out openings for drain 22 and thermostat 23 also surrounds the combustion chamber 16. Glass fiber blanket 42 is secured to tank wall 12 with a wire tie 29.

In addition, a component 24 is attached to the side wall 12 of tank 11. As shown in FIG. 2, component 24 typically comprises a temperature and pressure relief valve. However, other types of components may also be positioned on the outer wall of tank 11, such as a thermostat or other type of electrical control device.

It is important for purposes of proper operation and maintenance of component 24 that it be effectively shielded from the foam insulation material 40 injected into the space 26 through nozzle 45. Sleeve 30 comprises a flexible tubular sheet having a diameter which is greater than the diameter of tank 11. Sleeve 30 is preferably composed of a flexible, water-tight material which serves to contain and distribute liquid foam 40. Typically, sleeve 30 is composed of a plastic sheet such as polyethylene.

The lower end of sleeve 30 is tightly secured around the glass fiber blanket 42 with a wire tie 27. In this way, the bottom end of sleeve 30 is sealed to the side wall 12 of tank 11 since the glass fiber blanket 42 acts as a foam dam. The sleeve 30 extends to about the top edge of outer jacket 25. Positioned within the sleeve 30, and surrounding temperature and pressure relief valve 24, is a block of glass fiber insulation 43. Block 43 typically is somewhat compressable and has a width which is slightly greater than the distance between the outer jacket 25 and the side wall 12. In addition, block 43 has a hole therethrough providing access to component 24.

In the construction of water heater 10 (and referring to FIGS. 1A–1D), the glass fiber blanket 42 is secured with wire tie 29 around the bottom portion of the tank with its openings aligned with the thermostat 23 and the drain opening 22. The insulation head 41 may also be secured over the top of tank 11 around nipples 14, 15 and flue 20 at this time. Block 43 is also hung on component 42. The sleeve 30 is then slid over the tank 11 and the block 43 and secured over blanket 42 at its lower end with wire tie 27. Outer jacket 25 is then slid over tank 11 and sleeve 30 and sits loosely within bottom pan 28. Jacket 25 compresses block 43 between wall 12 and sleeve 30.

A low viscosity foamable liquid 40 such as a polyurethane foam forming liquid is injected into the space 26 between the tank 11 and the sleeve 30. This is accomplished by introducing the foamable liquid 40 through injection nozzle 45 which extends through opening 44 in block 41 into the sleeve 30. The amount of expandable liquid foam material injected may be predetermined depending upon the size of the cavity 26 and the type of foam.

It has recently been discovered that surprisingly good results are achieved when the foamable liquid has an initial viscosity (as defined herein) of less than about 300 centipoise (cps) when measured at a temperature of 25° C. and under atmospheric pressure and a relative humidity of about 50%. Preferably the foamable liquid has an initial viscosity of less than about 200 cps at the above-mentioned conditions.

By the term "initial viscosity", it is meant the viscosity of the liquid 40 as it is pumped out of nozzle 45 into space 26. Of course, it will be readily appreciated by those skilled in the art, that shortly after the foamable liquid 40 is pumped into space 26, it begins expand and mature thereby increasing its viscosity.

Typically foamable liquid 40 comprises two or more separate liquid components which are mixed immediately upstream from nozzle 45. Thus, the initial viscosity of the foamable liquid 40 is easily determined by measuring the viscosities of each of the individual liquid components and multiplying by their volume percent.

In a preferred embodiment, Stepan Company's STEPAN FOAM TM RI-9338 having two components may be used. Component A has an initial viscosity of 200 cps at 25° C. while component B has an initial viscosity of 100 cps at 25° C. Components A and B are metered into nozzle 45 in a 1:1 volume ratio.

The initial viscosity of the foamable liquid mixture having one or more components A,B, C, etc. may thus be computed using the following formula:

$$U_M = U_A(V_A) + U_B(V_B) + U_C(V_C)$$

wherein $U_M$ is the initial viscosity of the foamable liquid mixture, $U_A$ is the initial viscosity of component A, $U_B$ is the initial viscosity of component B, $U_C$ is initial viscosity of component C, $V_A$ is the volume fraction of component A, $V_B$ is the volume fraction of component B and $V_C$ is the volume fraction of component C.

Using the above mentioned formula, the initial viscosity of the STEPAN FOAM TM RI-9338 is computed to be about 150 cps at a temperature of 25° C. and under standard pressure and humidity.

Another important foam property required of the foams used to manufacture water heaters according to the present invention is the flow index. The flow index is simply the ratio of the time it takes the foam to begin to solidify (sometimes called "gel time" or "string time") to the time it takes the foam to rise to 95% of its maximum height as measured in a standard cylindrically shaped open foaming vessel. For foaming water heaters, it is preferable that the foam have a flow index greater than about 0.7, more preferably greater than 0.8.

Another important property of the foams used in the manufacturing methods of the present invention comprises the gel index. The gel index is the radio of the height of the foam at its gel time to its maximum rise height as measured in a standard cylindrically shaped open foaming vessel. In the methods of the present invention, the foam preferably has a gel index above about 0.8, more preferably above about 0.85.

The foams used in the present invention preferably develop low foaming pressures as they expand. Maximum foaming pressure may be measured using a jacketed cylindrical column having a height of about 24" and a diameter of about 5'. The jacketed column is maintained at a temperature of about 110° F. and has a transducer rated at 0–5 psig in the wall of the column about two inches from the bottom. A standard amount of foam is then injected into a foaming cup which is then secured to the base of the column. The foam then expands to fill the cup and begins to rise through the column. Pressure from the transducer is measured for a period of about ten minutes in order to determine the maximum generated pressure. Typically, the maximum pressure is recorded about two minutes after the foam is injected.

The foams used in the present invention preferably generate a maximum pressure of less than about 1.0 psig, more preferably less than about 0.75 psig.

It will be appreciated that wide varieties of foams may be utilized in the practice of this invention. Self-foaming materials may be used, in which the foaming process occurs from chemical reactions brought about by merely mixing the foam producing components with each other. In other forms the foam is created by high pressure gas injection, or other means. In any event, the foaming material tends to be highly flowable and has an initial viscosity below about 300 cps, a flow index greater than or equal to about 0.7, a gel index greater than or equal to about 0.8 and which generates a maximum pressure of less than about 1.0 psig. The foaming material becomes less flowable and of higher viscosity as the reactions proceed, ultimately setting up completely as a solid and rigid foam block.

The foamable liquid 40 is injected at an early stage of the foam-forming process and is freely flowable. Accordingly, it initially flows downwardly within sleeve 30.

The foamable liquid 40 is unable to flow past the seal between sleeve 30 and tank wall 12 on account of the wires ties 27, 29 and glass fiber blanket 42. In addition, foamable liquid 40 is unable to come into contact with component 24 due to the damming action of glass fiber block 43 which provides a seal between tank wall 12 and sleeve 30 surrounding component 24.

Figure 1:
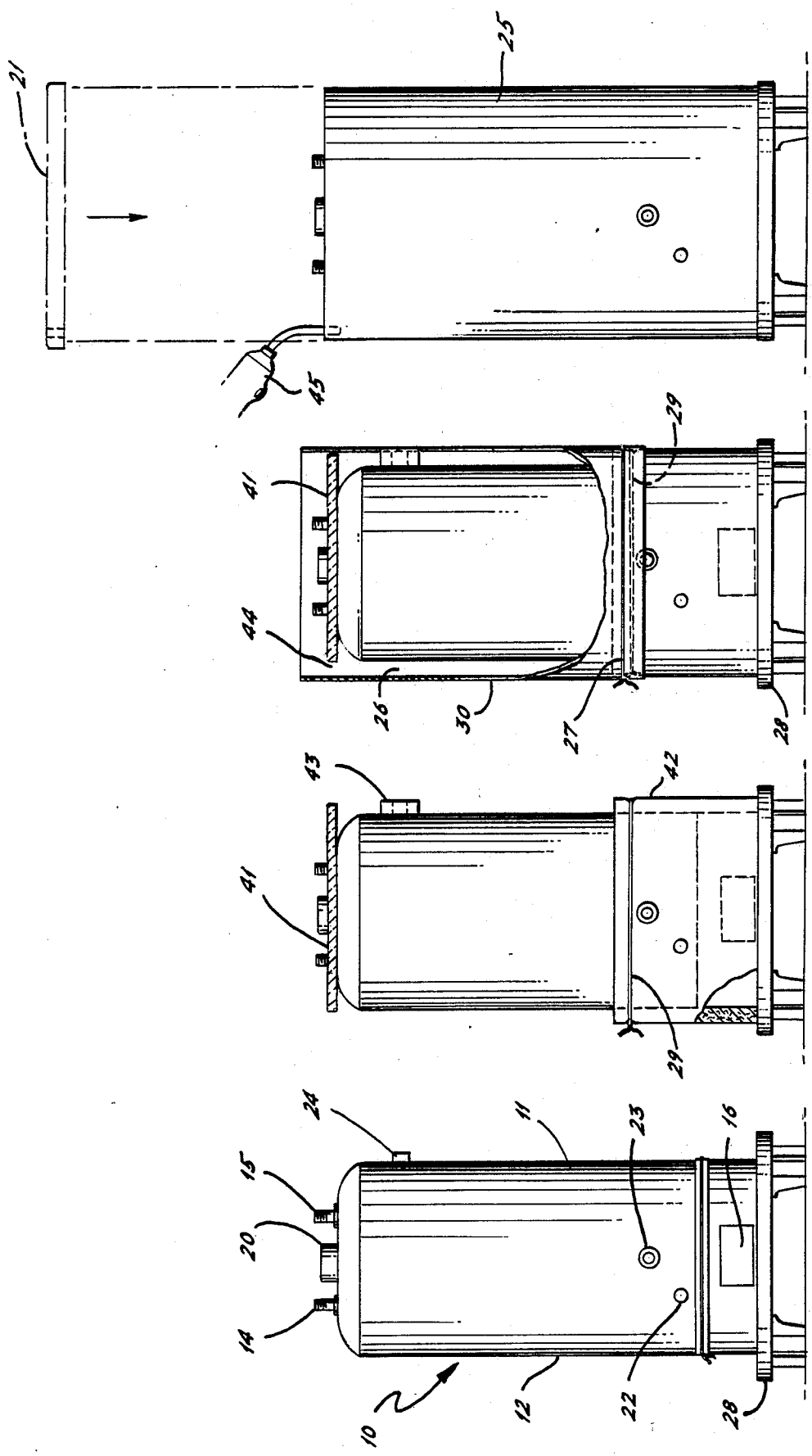
FIGS. 1A-1D are side elevational views, with parts thereof shown in section, of a single water heater during several successive production stages, with FIG. 1A showing an initial production stage and FIG. 1D showing a later production stage.

As shown in FIGS. 1 and 2, the foam 40 is preferably injected into annular space 26 through nozzle 45 while the top cover 21 is removed. This enables the nozzle 45 to be moved during foam injection thereby allowing the foam to be injected around a wider arc of the circumference of the tank 11. The foam may be injected continuously as the nozzle 45 is moved around tank 11 or in the alternative, a number of discrete shots of foam 40 may be made at different locations within the annular space 26. By spreading the injected foam around the circumference of tank 11, there is a much lesser likelihood that the outer jacket 25 and tank 11 will be pushed off center with respect to one another. This is true even in cases where the thin flexible outer jacket 25 simply sits loosely within bottom pan 28. In addition, there is less likelihood of bulging occurring in the thin flexible outer jacket 25 adjacent the foam injection site.

Once the liquid 40 has been injected, typically in an amount predetermined by the size of the cavity 26, the nozzle 45 is removed and a top pan 21 is then lowered into place (see FIG. 2).

As the liquid 40 is injected into sleeve 30 it is not confined by the sleeve 30 but is directed by the sleeve 30 to flow in a circumferential direction as the foam is generated. As more liquid 40 is injected into sleeve 30, it begins to expand and to increase in viscosity, and eventually fills the entire space 26.

After the liquid 40 has been injected, there is a period of approximately 1 to 5 minutes required for the liquid 40 to foam and expand to occupy the entire volume 26 surrounding tank 11 and to set. Thus, after injecting liquid 40 through nozzle 45, the top cover 21, shown in FIG. 1D, is lowered and secured over outer jacket 25. The top cover 21 has appropriate openings for nipples 14, 15 and flue 20.

As the foam expands, there is some increase in pressure within cavity 26. This increase in pressure insures that the foamable liquid 40 will flow into all parts of cavity 26.

In addition, the liquid 40 is prevented from contaminating the component 24. The sleeve 30 also provides an effective means of containing the liquid 40 in its least viscous stage, thereby preventing leakage of foam through the seams and joints of the outer jacket 25. This provides significant advantages of uniform coverage, ease of application and insulating effectiveness over the enclosed bags and envelopes of the prior art which were undesirable from production, efficiency, and cost standpoints. However, those skilled in the art will realize that the methods of the present invention can be used to foam a wide variety of water heaters, including those having a bag or envelope as well as those having none.

Once the liquid 40 has been injected and the top cover 21 has been secured to the jacket 25, the foamable liquid 40 is allowed to expand and set. As mentioned before, this procedure typically takes several minutes. The progress of the expansion of the foam 40 may be observed by providing a suitable hole in the top cover 21. This hole can also provide a suitable escape outlet for gases displaced by the expanding foam 40. Once the foam 40 has expanded to fill the entire space 26 surrounding the tank 11, the hole may be plugged in a known manner.

Alternatively, the top cover 21 may be installed on the outer jacket 25 before the foaming step. In such a case, the foam 40 is injected through suitable holes provided in the top cover. Likewise, in this alternative procedure, the expansion of the foam 40 may be observed through one of the holes in the top cover which is later plugged at a suitable time.

Although the invention has been described in the specification with references to specific forms thereof, it will be appreciated that a wide variety of equivalents may be substituted all without departing from the spirit and scope of the invention as defined in the appended claims.

I claim:

1. In a method of insulating a water heater having a water tank with an expandable polyurethane foam insulating material, the steps comprising:
   (a) placing a flexible sleeve over the tank surface, the sleeve being dimensioned larger than the tank to permit positioning of said material between said sleeve and said tank, said sleeve being open along its top and sealed about the tank along its bottom;
   (b) securing a jacket around the tank and over the sleeve, the jacket being dimensioned to provide a space therebetween in which said sleeve is positioned;
   (c) introducing an expandable polyurethane foam forming liquid having an initial viscosity of less than about 300 cps when measured at a temperature of 25° C. and under atmospheric pressure and a relative humidity of about 50%, a flow index $\geq$ about 0.7, a gel index $\geq$ about 0.8 and which generates a maximum pressure of $\leq$ about 1.0 psig, between the sleeve and the tank; and
   (d) securing a cover on the top of the jacket to close off the top of the jacket, whereby the foam forming liquid expands within the sleeve and against the tank to fill said space, and
   (e) causing the resulting polyurethane foam to solidify in place.

2. The method according to claim 1, wherein the sleeve comprises a plastic tube.

3. The method according to claim 1, wherein a component intended to be kept substantially free from contact with the expandable foam forming liquid is provided on the tank wall, said component being surrounded by a dam of insulating material, the dam being positioned between the sleeve and the tank and forming a seal therebetween to prevent the foam forming liquid from contacting the component.

4. The method according to claim 3, wherein the component is a valve.

5. The method according to claim 1, wherein the heater is a gas water heater.

6. The method according to claim 1, wherein said sealing is achieved by tying a lower portion of the sleeve around the tank.

7. The method according to claim 3, wherein the component comprises a thermostat.

8. The method according to claim 3, wherein the component comprises a drain opening.

9. The method according to claim 3, wherein the dam is composed of glass fibers.

* * * * *